United States Patent [19]

Daly

[11] Patent Number: 5,254,930
[45] Date of Patent: Oct. 19, 1993

[54] FAULT DETECTOR FOR A PLURALITY OF BATTERIES IN BATTERY BACKUP SYSTEMS

[75] Inventor: James A. Daly, Chelsea, Mass.

[73] Assignee: Digital Equipment Corporation, Maynard, Mass.

[21] Appl. No.: 896,713

[22] Filed: Jun. 10, 1992

[51] Int. Cl.$^5$ .............................................. H02J 7/04
[52] U.S. Cl. ......................................... 320/15; 320/39
[58] Field of Search ....................... 320/31, 32, 43, 44, 320/48, 39, 40, 6, 14, 15, 16, 17

[56] References Cited

U.S. PATENT DOCUMENTS

| | | | |
|---|---|---|---|
| 3,493,837 | 2/1970 | Sparks et al. | 320/31 X |
| 3,555,395 | 1/1971 | Beery | 320/6 X |
| 3,623,139 | 11/1971 | Dickerson | 320/39 X |
| 3,786,343 | 1/1974 | Ehlers | 320/48 X |
| 4,079,303 | 3/1978 | Cox | 320/17 |
| 4,084,124 | 4/1978 | Kapustka | 320/15 X |
| 4,331,911 | 5/1982 | Park | 320/14 |
| 4,575,670 | 3/1986 | Hignutt | 320/14 |
| 4,584,514 | 4/1986 | Kaminski | 320/40 X |
| 5,003,244 | 3/1991 | Davis, Jr. | 320/17 |
| 5,049,803 | 9/1991 | Palanisamy | 320/39 X |

Primary Examiner—Kristine L. Peckman
Attorney, Agent, or Firm—Denis G. Maloney; Barry Young; Albert Cefalo

[57] ABSTRACT

According to the invention a battery charger for charging a plurality of batteries includes a voltage supply connected by a pair of switches to a power converter including a transformer having a primary winding and a plurality of secondary windings. Each secondary winding is coupled to a battery. Voltage is transferred from the voltage supply to the primary winding when the switches are closed and current is transferred from the secondary windings to the batteries when the switches are open. Charge control circuitry monitors the voltage of each battery and the total battery voltage and determines the amount of current to supply to the batteries. Supervisory logic monitors the current received from the secondary windings by each of the batteries and the voltage of each of the batteries to determine the charge status of each battery and the operating status of the power converter. If one battery continues drawing a greater proportion of the maximum current relative to the remaining batteries after the predetermined voltage limit has been reached, this indicates that there is a short circuited cell causing one battery to draw a greater proportion of current or that there is a cell with high impedance causing one battery to draw a smaller proportion of current. For both fault conditions, the supervisory circuit detects the current imbalance and generates a shutdown signal. The shutdown signal is also asserted when the supervisory circuit detects an over voltage condition in any of the batteries, or an over current in the primary winding. The shutdown signal subsequently precludes further operation of the charge control circuit for a predetermined time period, alerting the system operator of a problem within the battery backup system, and avoiding the loss of vital information and expensive computing time by allowing for correction of the fault condition before damage results.

7 Claims, 5 Drawing Sheets

FAULT DETECTOR FOR A PLURALITY OF BATTERIES IN BATTERY BACKUP SYSTEMS

FIELD OF THE INVENTION

This invention relates generally to the field of battery chargers, and more particularly to the detection of battery faults.

BACKGROUND OF THE INVENTION

In order to provide protection against power outages, modern computer systems typically use battery backups. When the AC voltage supplied by a computer's power supply to the computer drops below a certain voltage level, a trigger circuit causes a battery to act as an alternative power source. This allows the computer to save its memory contents during the outage, and if possible, to perform an orderly shutdown. Alternatively, a battery backup system may allow for complete operation of the computer system until AC voltage is restored.

Typically, the battery voltage is supplied by a plurality of battery packs, each containing a plurality of battery cells (usually 6). A battery charger must keep the battery packs charged to assure that the battery will be able to supply the proper level of voltage and energy to the computer when necessary.

Each minute of lost power to a computer system which supports a critical task (for example, processing bank transactions) could result in a loss of hundreds of thousands of dollars. The battery backup helps to minimize these losses and add reliability to the computer system. However, in the event that one battery is damaged, either by a short circuited cell or a by cell with increased impedance, the battery packs may not be able to support the computer system when required. Presently, the deterioration of a battery becomes apparent only when it fails to adequately support the computer system when requested, and data is lost. It would be desirable to have notification of the impending failure of a battery backup system before vital information and computing time is lost.

SUMMARY OF THE INVENTION

According to the invention a battery charger for charging a plurality of batteries includes a voltage supply connected by a pair of switches to a power converter. The power converter includes a transformer having a primary winding and a plurality of secondary windings. Each secondary winding is coupled to a battery. Voltage is transferred from the voltage supply to the primary winding when the switches are closed and current is transferred from the secondary windings to the batteries when the switches are open.

Charge control circuitry monitors the voltage of each battery and the total battery voltage and determines the amount of current to supply to the batteries. The charge control unit operates in two modes: voltage mode and current mode. When the total battery voltage reaches a predetermined voltage limit, termed the "float voltage", the batteries are considered charged and the charge control circuitry operates in voltage mode. In voltage mode, a minimum current which is required to maintain the battery voltage at float voltage is supplied to the batteries. When the voltage of either battery falls below float voltage, the batteries require charging and charge control unit operates in current mode. In current mode, the charge control circuitry continuously delivers a maximum allowable current (subject to component tolerance) to the batteries until the predetermined voltage limit is again attained. The total current delivered to the batteries is apportioned between the batteries, with the batteries at a lower charge state drawing more of the charging current than the batteries with a higher charge state. The batteries with a lower charge state continue to draw higher proportions of the current until the state of charge of all batteries in the backup system is equal, at which point all the batteries draw equal current. When the batteries have been charged to float voltage, they require less current than that which is being supplied in current mode to maintain float voltage, and the charge control unit reverts to voltage mode.

Supervisory logic monitors the current received from the secondary windings by each of the batteries and the voltage of each of the batteries to determine the charge status of each battery and the operating status of the power converter. If one battery continues drawing a greater proportion of the maximum current relative to the remaining batteries after the predetermined voltage limit has been reached, this indicates two possible fault conditions in the battery backup system. The first possible fault condition is that there is a short circuited cell causing one battery to draw a greater proportion of current. The second possible fault condition is that there is a cell with high impedance causing one battery to draw a smaller proportion of current. For both fault conditions, the supervisory circuit detects the current imbalance and generates a shutdown signal. The shutdown signal is also asserted when the supervisory circuit detects an over voltage condition in any of the batteries, which could potentially increase temperatures in the battery charger and damage components. In addition, the shutdown signal is asserted in the event of an over current in the primary winding of the power converter caused by failure of the battery charger. The shutdown signal precludes further operation of the charge control circuit for a predetermined time period and alerts the system operator of a problem within the battery backup system.

Thus, the present invention allows for detection of faults within a battery backup system, thereby providing means for avoiding the loss of vital information and expensive computing time by allowing for correction of the fault condition before damage results.

Other objects, features and advantages of the invention will become apparent from a reading of the description of the preferred embodiment when taken in conjunction with the drawings in which like reference numerals refer to like elements in the several views.

DETAILED DESCRIPTION OF THE PREFERRED EMBODIMENT

Figure 1:
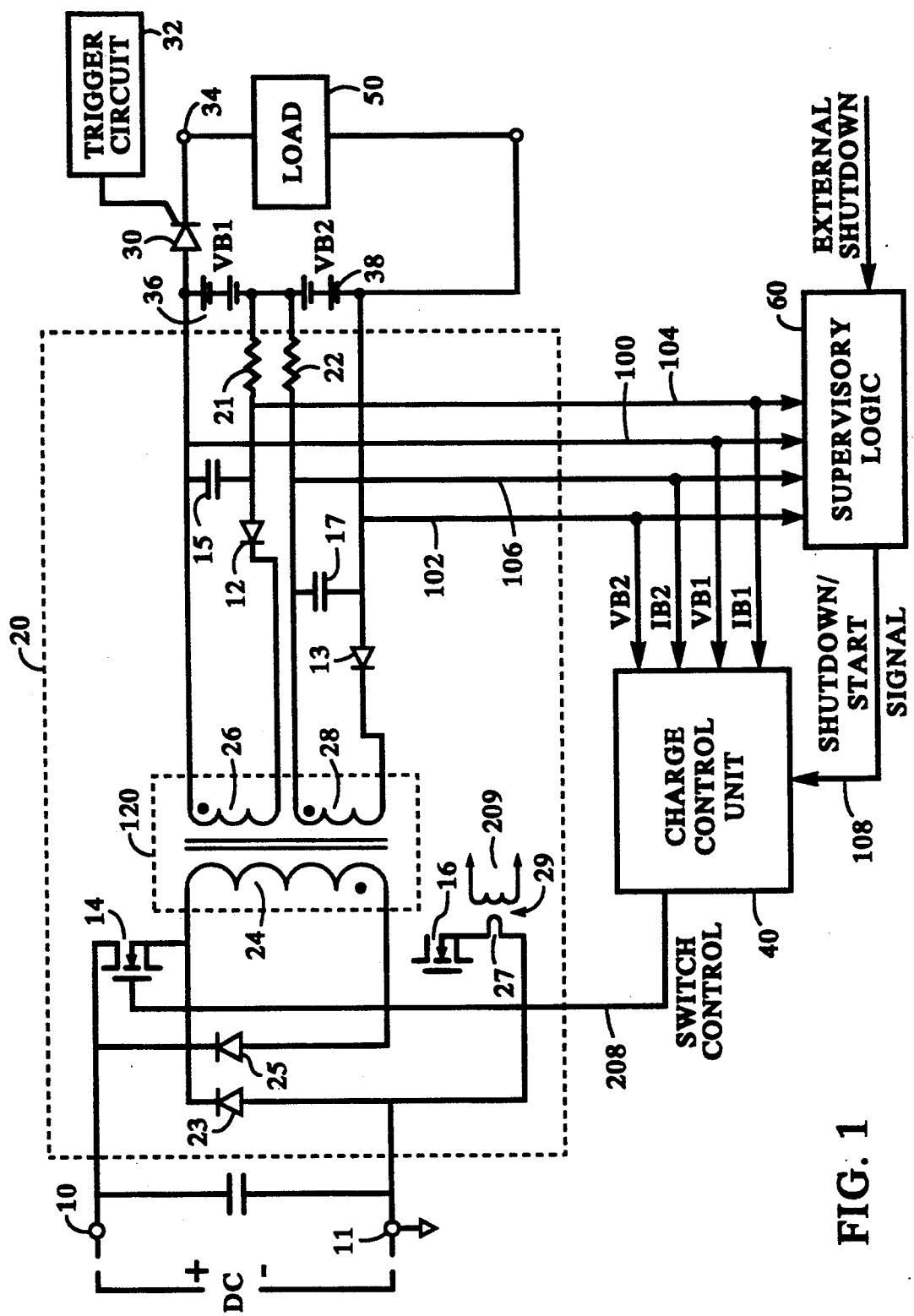
FIG. 1 is a block diagram illustrating a battery backup system embodying the invention.

Referring now to the drawings, FIG. 1 shows the basic components of a battery backup system embodying the present invention suitable for use in a computer system. A voltage source 10 supplies a d.c. input voltage to a power conversion unit 20, across the input terminals of which a reservoir/filter capacitor is connected. The power conversion unit 20 includes a transformer 120 with a primary winding 24 and, for example, two secondary windings 26 and 28. The primary winding 24 is connected to the terminals 10 and 11 by MOSFET power switches 14 and 16 respectively and also by clamp diodes 25 and 23 respectively. The secondary windings 26 and 28 are coupled to batteries 36 and 38 respectively.

The operative position of the switches 14 and 16 is controlled by the value of a signal SWITCH CTRL on line 208 which is a signal provided by a charge control unit 40. Voltage from the voltage source 10 is applied to the primary winding 24 of the transformer 20 during a period Ton when switches 14 and 16 are in a closed position (or conducting). During a period Toff when the switches 14 and 16 are in an open position (or non conducting), current is transferred from the primary winding 24 to the secondary windings 26 and 28. The current from each secondary winding 26 and 28 is subsequently transferred to charge its respective battery 36 and 38 to a nominal float voltage of 54.5 volts. The charge control unit 40 continuously cycles the switches 14 and 16 between the open and closed positions during successive switching cycles Ts=Ton+Toff. Energy is transferred from the voltage source 10 to the primary winding 24 when the switches 14 and 16 are closed. This energy is delivered to the secondary windings 26 and 28 when the switches 14 and 16 are open for delivery to the batteries 36 and 38. In the preferred embodiment, the time period for the switching cycle can vary between 19.6 microseconds and 22.2 microseconds, the variation being due to component tolerances.

The discharge of the batteries 36 and 38 occurs when an SCR 30 receives a trigger signal from a trigger circuit 32. The trigger circuit 32 activates the SCR if a.c. power to the load 50 (e.g. a computer) fails. When this occurs, the power converter supply voltage 10 (also derived from the a.c. power supply) also fails so the charge control unit 40 is inhibited and the SCR 30 turns on, causing the battery energy to be transferred to the load 50 at output 34. The load utilizes the voltage from the batteries 36 and 38 to perform an orderly shutdown or to provide a back up supply to the load completely until the a.c. power returns (or until the batteries become discharged). When the power supply returns, the charge control unit 40 is again activated and operation of the power converter recommences.

Supervisory logic 60 monitors the voltage of each battery (VB1 and VB2) on lines 100 and 102 and the voltage generated across each battery current measurement resistor 21 and 22 (IB1 and IB2) on lines 104 and 106 to ensure that the power conversion unit 20 and the batteries 36 and 38 are operating as expected. In the event that the power conversion unit 20 or the batteries 36 and 38 are faulty, the supervisory logic 60 asserts a SHUTDOWN signal on line 108. Assertion of the SHUTDOWN signal effects shutdown of the power converter and stops battery charging. A more detailed discussion of the faults recognized by the supervisory logic 60 will be discussed later in the specification.

Power Converter

Figure 2:
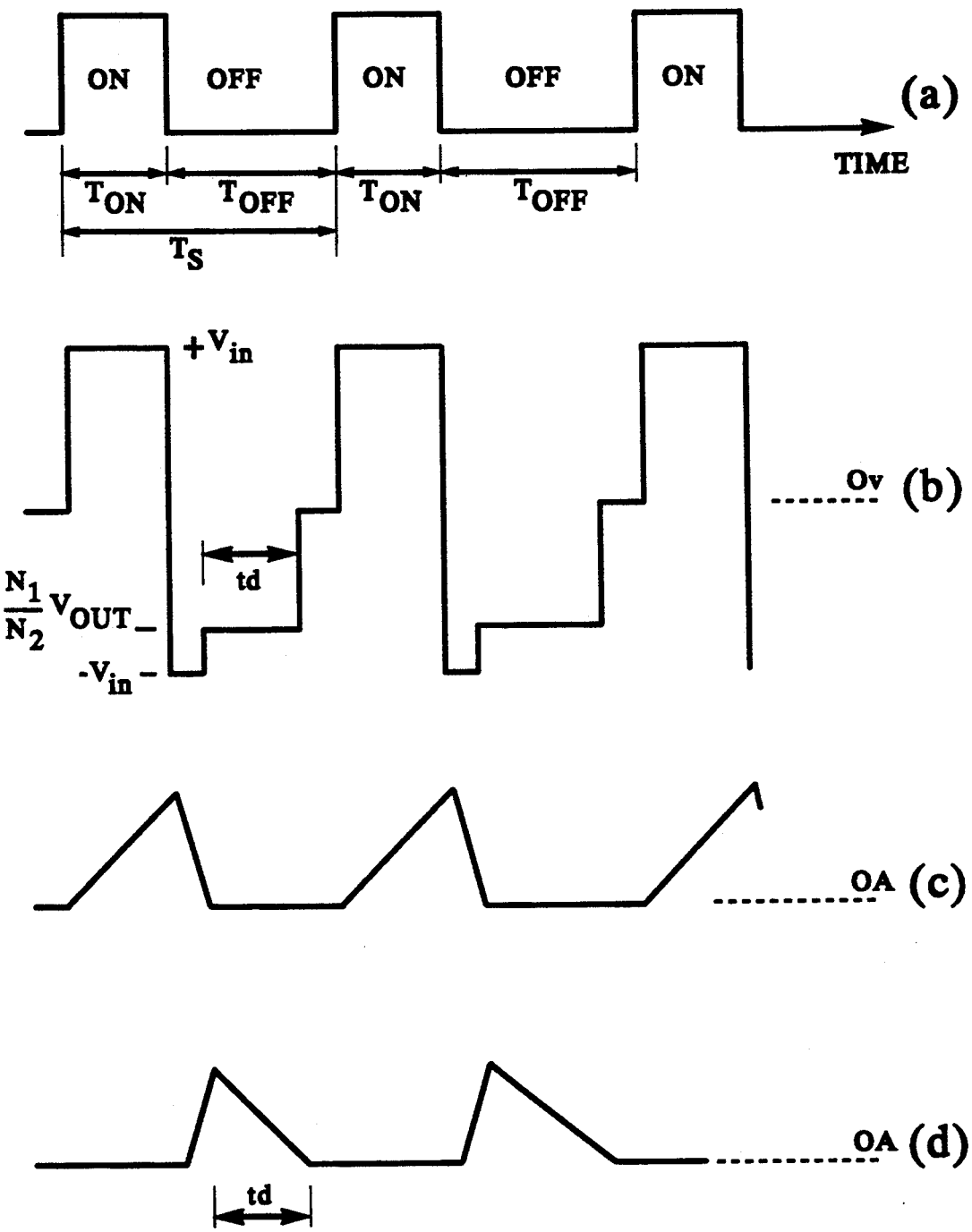
FIG. 2 shows waveforms illustrating operation of the system shown in FIG. 1.

Operation of the power converter 20 shown in FIG. 1 will be described with reference to the operating waveforms shown in FIG. 2.

At the start of a switching cycle Ts, there is no current flowing in either the transformer primary winding 24 or secondary windings 26 and 28. During a period Ton, (FIG. 2a) when the switches 14 and 16 are closed by the signal SWITCH CONTROL on line 208, the voltage source 10 is applied to the primary winding 24 (FIG. 2b). The voltage source 10 is positive referred to ground 11. The secondary windings 26 and 28 reflect this voltage. The voltage which is reflected across the transformer secondary windings 26 and 28 is equal to the voltage of the voltage source 10 multiplied by the ratio of secondary winding turns to primary winding turns. Output rectifiers 12 and 13 are electrically oriented such that a reverse bias voltage is applied to these devices while the switches 14 and 16 are closed, precluding the conduction of current to the secondary windings 26 and 28. Therefore, no energy is transferred from the primary winding 24 to the secondary windings 26 and 28 while the switches 14 and 16 are closed.

During the time period (Ton) that the switches 14 and 16 are closed, the current in the primary winding increases as shown in FIG. 2c, according to the following equation, where Iprim is the primary winding current, Vin is the voltage of the voltage supply 10, and Lprim is the primary winding magnetizing inductance of the power transformer 120:

$$Iprim = (Vin \times Ton)/Lprim$$

Iprim, the current of the primary winding 24, is monitored by a second transformer 37. The output from the secondary winding 29 of this transformer is used by the supervisory logic 60 and will be discussed later in this specification.

When the switches 14 and 16 are subsequently opened (for time Toff, FIG. 2a) the current in the primary winding 24 must continue to flow until it is transferred from the primary winding 24 to the secondary windings 26 and 28. To continue current flow, the current is conducted through clamp diodes 23 and 25 back to the voltage source 10. Hence, in order to maintain current flow, the voltage across the primary winding 24 is reversed (FIG. 2b), effectively causing the current in the primary winding to decay (FIG. 2c) and the current in the secondary windings 26 and 28 to increase (FIG. 2a) until current flow ceases in the primary winding 24.

At this point, virtually all of the energy which was stored in the primary winding 24 has been transferred to the secondary windings 26 and 28. When the current in primary winding 24 has decayed to zero, clamp diodes 23 and 25 stop conducting and the secondary winding current is delivered to the combination of the capacitors 15 and 17 and the batteries 36 and 38. The total current carried by each of the secondary windings 26 and 28 at this point is defined by the below relationship, where Is is the total secondary winding current, N1 is the number of turns of the primary winding 24, N2 is the number of turns of each secondary winding of the transformer:

$$Is = (N1/N2)Iprim$$

In the preferred embodiment, each secondary winding 26 and 28 has four turns, while the primary winding has 10 turns. The amount of current which is delivered by each secondary winding 26 and 28 to the batteries 36 and 38 is determined by the amount of current that each battery 36 or 38 will accept at its particular charge voltage level. After a given period of time termed td (FIG. 2d), the current delivered by each secondary winding 26 and 28 decays to 0. The switching cycle (Ts=Ton+Toff) is advantageously designed such that Toff is always greater than td to allow for complete delivery of the transformer secondary winding current to the batteries before the start of the next switching cycle. After the secondary winding current has decayed to 0, the current is supplied to the batteries 36 and 38 by the capacitors 15 and 17 until the next switching cycle.

Charge Control Unit

As mentioned previously, the charge control circuit 40 controls the cycling of the switches 14 and 16. The longer that the switches 14 and 16 are closed (Ton), the greater the amount of energy transferred to the primary winding 24 and hence the greater amount of current delivered to the secondary windings 26 and 28 and batteries 36 and 38 when the switches 14 and 16 open (Toff). By controlling the duty cycle of the switches 14 and 15, that is the ratio between Ton and (Ton+Toff), the charge control circuit 40 controls the amount of current delivered to the batteries 36 and 38.

Modes of Operation

The charge control unit 40 operates in two modes, current mode and voltage mode. In voltage mode, the voltage of both batteries 36 and 38 is equal to a predetermined limit, called the float voltage. When a healthy battery has been charged to the float voltage, very little current is needed to maintain this voltage. This small amount of current is termed the float current. For example, in the preferred embodiment, to maintain a float voltage of 54.5 V per battery at 25 degrees C, the total float current drawn by two healthy batteries would probably be in the region of 0–100 mA.

If either battery 36 or 38 is in a discharged state, it will require a greater current than the float current to regain float voltage. The charge control unit 40 controls the switches 14 and 16 to increase the current supplied to the batteries 36 and 38. The supervisory logic 60 monitors the increase of current to the batteries to determine when the charge control unit 40 is operating in current mode. The supervisory logic considers the charge control unit 40 to be in current mode when the current being delivered to the batteries exceeds a threshold range of 4.58 to 4.87 Amps. Because the power delivery capability of the charger is limited, it cannot supply greater than 5.0 to 5.36 Amps while maintaining float voltage. Therefore, in current mode, the voltage of the batteries 36 and 38 is allowed to drop below the float voltage while the total current supplied to the batteries 36 and 38 is increased to deliver the maximum allowable current (5.0 to 5.36 Amps based on component tolerances) to the batteries.

The battery voltages VB1 and VB2 might be as low as 35 V for an extremely discharged battery or as high as 48 V for batteries which have not been significantly discharged. As current is returned to the batteries 36 and 38, the charge control unit 40 continues operating in current mode and the voltages VB1 and VB2 of the batteries 36 and 38 each increases. If, for example, battery 36 initially has a lower charge state than battery 38, battery 36 will accept a greater proportion of the total current. As its charge gradually approaches the charge state of battery 38, both batteries 36 and 38 will accept a similar portion of the total charging current. When both battery voltages VB1 and VB2 equal the float voltage, the charge control unit 40 resumes operation in voltage mode and the total current supplied by the charge control unit 40 decreases to float current level.

Functional Description

Referring again to FIG. 1, the charge control unit 40 employs the battery voltages (VB1 on line 100 and VB2 on line 102) and the voltages generated across the battery current measurement resistors 21 and 22 (IB1 on line 104 and IB2 on line 106) in determining the duty cycle of the switches 14 and 16.

Figure 3:
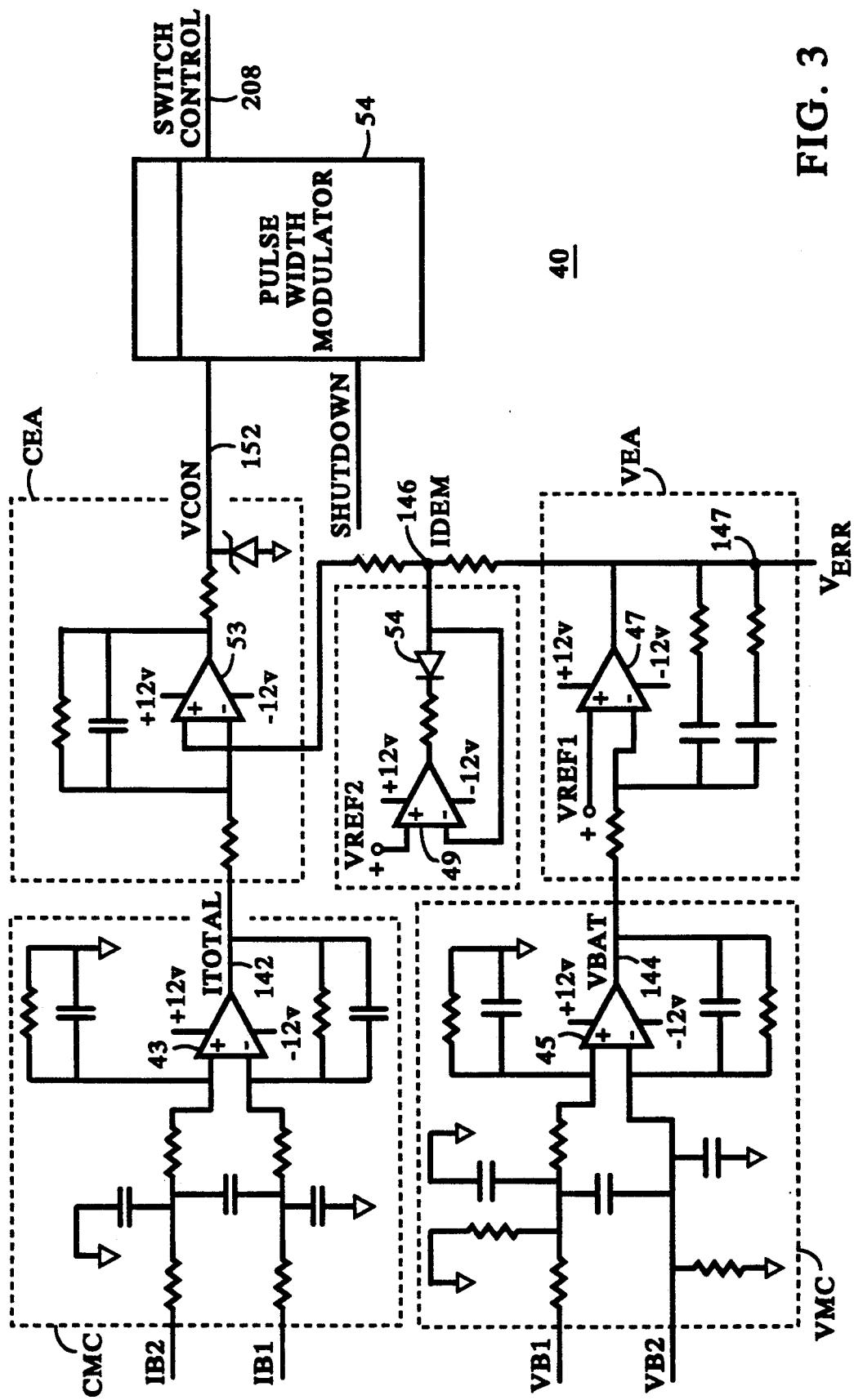
FIG. 3 is a schematic diagram of the charge control unit in FIG. 1.

Referring now to FIG. 3, the opposite polarity voltages IB1 and IB2 are input to a current measurement circuit CMC, filtered, and summed by an operational amplifier 43 to produce an output voltage ITOTAL on line 142. The voltage ITOTAL is exactly proportional to the total battery current.

The battery voltages VB1 and VB2 are input to the voltage measurement circuit VMC, filtered, and summed by an operational amplifier 45 which converts the positive and negative polarity voltages (VB1 positive, VB2 negative) into a positive output voltage VBAT on the line 144 which is proportional to the sum of the absolute value of both voltages.

VBAT is input to the voltage error amplifier 46 and compared with a voltage reference input VREF1 from line 148. VREF is a temperature compensated voltage representing the battery float voltage. In the embodiment being described, VREF varies between 4.46 and 4.48 volts over a temperature range of 16°–50° C.

VBAT on line 144 and VREF1 on line 148 are compared in the voltage error amplifier VEA by an operational amplifier 47. A filtered output voltage VERR on line 147 is proportional to the voltage difference between VBAT and VREF1. The voltage VERR is fed into the limiter 50, which uses an operational amplifier 49 and a diode 51 to produce an output voltage IDEM on line 146. The value of IDEM is limited to 5.1 volts (which is the temperature independent value of VREF2) to ensure that no more than 5.36 Amps of current (the maximum possible current due to component tolerances in the preferred embodiment) is required from the secondary windings 26 and 28. Thus IDEM is a voltage which represents the discharge status of the batteries 36 and 38.

Figure 5:
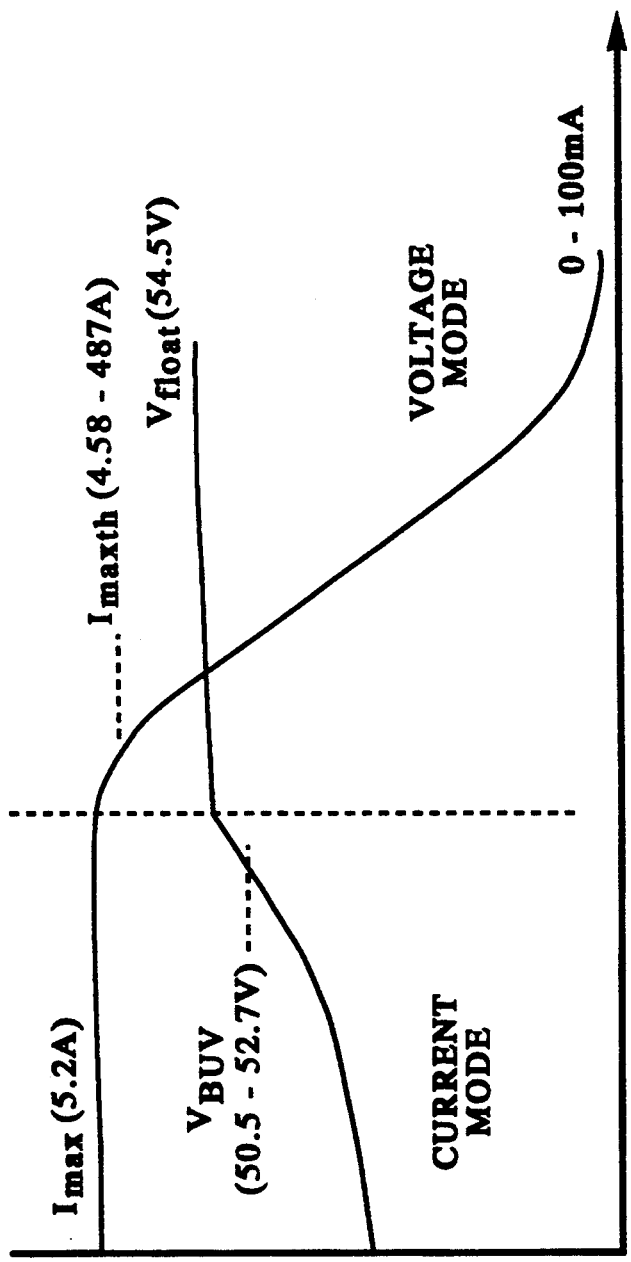
FIG. 5 shows voltage and current relationships illustrative of operation of the charge control unit shown in FIG. 3.

The limiter circuit 50 acts as follows: when the batteries 36 and 38 are fully charged, VERR is less than 5.1 V and the value of IDEM on line 146 (unchanged by the limiter circuit 50) is equal to the value of VERR. At this point, the batteries 36 and 38 can be maintained at float voltage by a charging current of less than 5.0 to 5.36 Amps. However, if the batteries 36 and 38 are significantly discharged, more than 5.0 to 5.36 Amps would be required to maintain the batteries 36 and 38 at float voltage. This required current is represented in the voltage value of VERR, which would exceed 5.1 Volts. The value of IDEM, however, is limited to 5.1 Volts by the limiter circuit 50, thereby limiting the charge current requested to 5.0–5.36 Amps and causing the voltage of the batteries 36 and 38 to fall below the float voltage. At this point, the charge control unit 40 is operating in a current mode (FIG. 5).

As the batteries are charged, the voltage difference between VBAT and VREF, represented by VERR, will fall below 5.1 volts, at which point IDEM will no longer be limited to 5.1 V by the limiter circuit 50, but will track the value of VERR. Thus, as the batteries 36 and 38 reach float voltage, VBAT equals VREF, and the charge control unit 40 returns to voltage mode.

It is the comparison of IDEM on line 146 (representing the voltage difference between the float voltage and the sum of the voltages of the batteries 36 and 38) with ITOTAL on line 132 (the voltage representing the sum of the current flows through the current measurement resistors 15 and 17) which creates a feedback loop for controlling the duty cycle of the switches 14 and 16. This comparison is made by the current error amplifier 52. When IDEM is equal to ITOTAL, the batteries 36 and 38 are getting either the correct amount of current to maintain the float voltage (in voltage mode) or the current limit of 5.0 to 5.36 Amps (in current mode). When IDEM is smaller than ITOTAL, the amount of current delivered to the batteries 36 and 38 should be decreased, until ITOTAL is equal to IDEM. Likewise, when IDEM is greater than ITOTAL, the amount of current delivered to the batteries 36 and 38 should be increased. The amount that ITOTAL should be increased or decreased to align with IDEM is indicated by a voltage VCON on line 152 representing the difference between the two voltages, derived with an operational amplifier 53 wired as a high gain amplifier.

As stated previously, the amount of time that the switches 14 and 16 are closed (Ton) dictates the amount of current in the primary winding 24, and subsequently the amount of current delivered to the batteries 36 and 38. VCON is utilized by a pulse width modulator 54 in determining the duty cycle (Ton/(Ton+Toff) of the switches. The larger VCON, the higher the duty cycle ratio, up to a maximum of 49% (wherein the switch is closed for slightly less than half of the total switching cycle). The pulse width modulator 54 utilized in the present invention also has the capability of being shut down. This functionality is utilized by the supervisory logic 60 as will be described later in the specification. The pulse width modulator 54 thus controls the value of SWITCH CTRL on line 108, controlling the cycling of the switches 14 and 16 and subsequently the delivery of secondary winding current to the batteries 36 and 38.

Supervisory Logic

Figure 4:
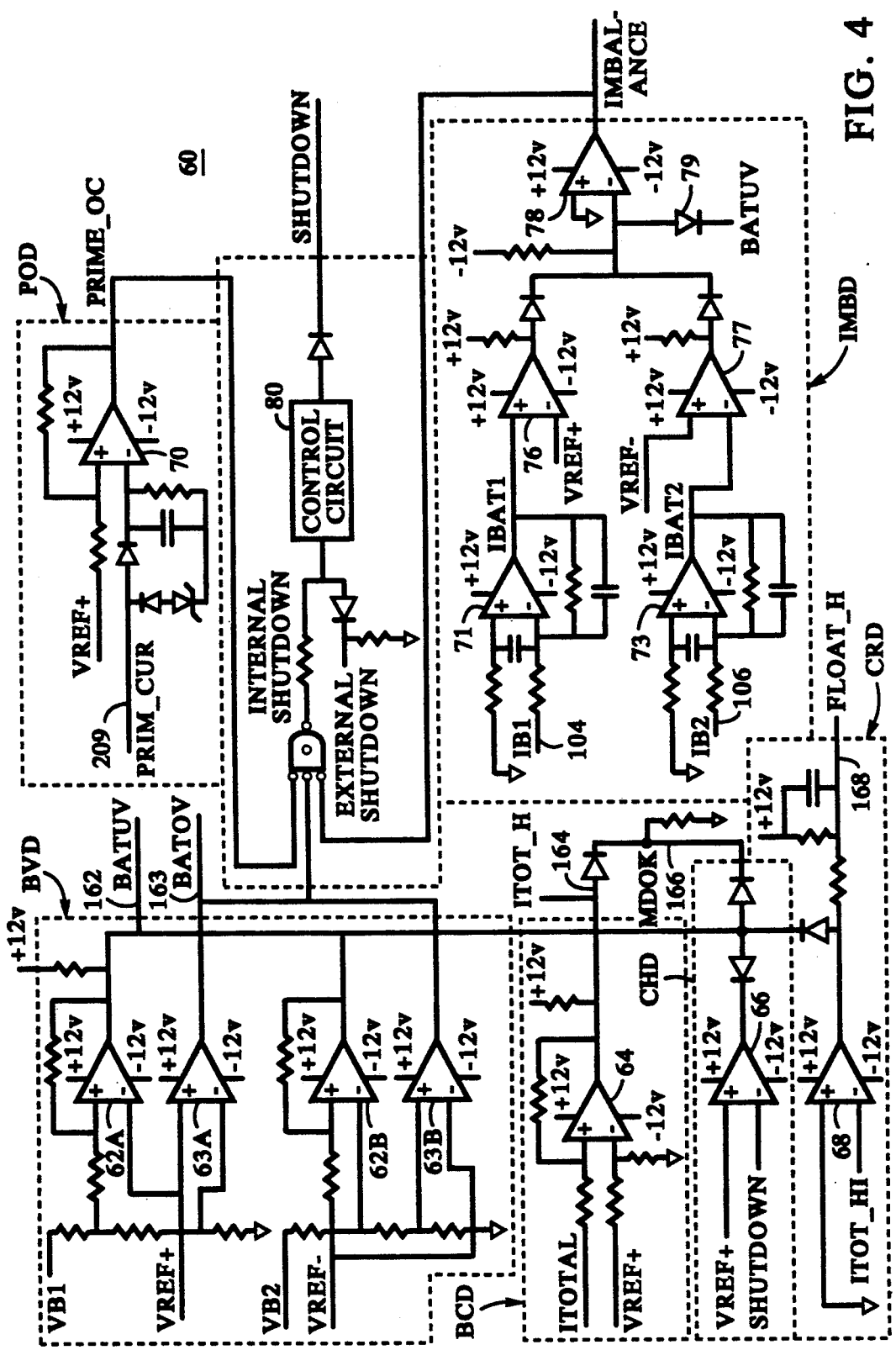
FIG. 4 is a schematic diagram of the supervisory logic in FIG. 1.

Referring now to FIG. 4, the supervisory logic 60 is shown. The supervisory logic 60 performs a variety of functions, including: monitoring the batteries 36 and 38 for an overvoltage condition, determining whether the charge control unit 40 and power converter 20 are functioning correctly, detecting possible overcurrent in the transformer primary winding 24 and determining that either of the batteries 36 or 38 is damaged or degraded. The supervisory logic 60 functions to assert the signal SHUTDOWN on line 108 in the event that any of the above listed conditions occur, or if a shutdown is requested by an external user. Each functional unit of the supervisory logic 60 operates using +12 v and −12 v bias voltages to drive logical output signals.

A battery voltage detector BVD monitors VB1 and VB2 to detect if the voltage of either battery 36 or 38 either exceeds a voltage (battery overvoltage threshold) which is too high for safe and reliable operation (in the range of 67 to 70 volts) or drops below a battery undervoltage threshold which is always less than the float voltage over all operating temperatures (approximately 50.5 to 52.7 volts). The battery voltage detector 62 generates two output signals BATOV on line 162 (output from comparator 62A or 62B) and BATUV on line 163 (output from comparator 63A or 63B) both of which equal +12 volts if VB1 and VB2 exceed the float voltage but are under the overvoltage range. However, if the voltage of either of the batteries 36 and 38 exceeds the 67-70 volt range BATOV is pulled down to −12 volts. Likewise, BATUV is also pulled down to −12 volts if the voltage of either battery 36 or 38 drops below the battery undervoltage threshold (approximately 50.5 to 52.7 volts). Thus, BATOV and BATUV notify other functional blocks within the supervisory logic 60 whether the voltages of the batteries 36 and 38 have deviated from the desired voltage range.

Similarly, a battery current detector BCD monitors ITOTAL to detect when the total battery current deviates from a maximum current threshold (4.58-4.87 amps). At the output of an comparator 64, the battery current detector BCD generates a voltage ITOT_H, which is equal to +12 v when ITOTAL indicates that the total current being drawn by the batteries exceeds the maximum current threshold. However, if ITOTAL indicates that the current drawn by the batteries 36 and 38 is less than the maximum current threshold, the signal ITOT_H is pulled down to −12 v. Thus ITOT_H indicates to what extent the batteries 36 and 38 are being charged.

ITOT_H and BATUV are utilized by the charger ok detector CHD to determine if the charge control unit 40 is operating as expected. The charger ok detector CHD indicates normal or abnormal charger operation by generating a signal MDOK on line 166. If the batteries are below the float voltage, as indicated by BATUV having a value of −12 v, then likewise, the batteries 36 and 38 should be drawing a current which is greater than the maximum current threshold, as indicated by ITOT_H having a value of +12 v. As the batteries 36 and 38 are charged, the battery voltage increases until both battery voltages exceed the battery undervoltage threshold, at which point BATUV will equal +12 V. At this point, the charger is still delivering the maximum allowable current of 5.0 to 5.36 Amps to the batteries, and therefore both BATUV and ITOT_H are equal to +12 V. As the charging continues, the battery current gradually decreases below the current threshold of 4.57 to 4.87 Amps, and the charge control unit 40 resumes operation in voltage mode. Because the current has dropped below the current threshold, ITOT_H is pulled down to −12 V, while BATUV remains equal to +12 V.

Normal charger operation is indicated by MDOK being equal to +12 V, which occurs during the three conditions described above: when either ITOT_H OR BATUV are equal to +12 V, or when both ITOT_H and BATUV are equal to +12 V. However, if the voltage of either battery 36 and 38 is less than the battery undervoltage (BATUV equal to −12 V), and the charging current is less than the current threshold (ITOT_H equal to −12 V), abnormal charger operation is indicated by MDOK being equal to 0V. MDOK is thereby available as a signal to indicate abnormal charger operation as may be desired.

BATUV and ITOT_H are also combined by the charge rate detect circuit CRD (which employs a comparator 68) to ascertain whether the charge control unit 40 is operating in current mode or voltage mode. If BATUV is equal to +12 v and ITOT—H is equal to −12 v, then the voltages of the batteries 36 and 38 are above the float voltage, the batteries are drawing less current than the maximum current detection threshold level, and the charge control unit 40 is operating in voltage mode. The charge rate detect circuit CRD generates FLOAT H on line 168, which is equal to +12 v when the charge control unit is operating in voltage mode, and −12 v when the charge control unit 40 is operating in current mode. FLOAT H is available as a signal to indicate available battery capacity as may be desired.

Referring now to FIG. 1, transformer 37 produces a current in its secondary winding 29 which is one hundredth of the current in its primary winding 27. The current in primary winding 27 is exactly equal to the current in primary winding 24. The current of the secondary winding, PRIM—CUR on line 209, is fed into the primary overcurrent detector POD, as shown in FIG. 4. The primary overcurrent detector POD includes a comparator 70 to detect if the current in the transformer primary winding 24 exceeds a predetermined limit, for example 9.1 amps. An overcurrent in the primary winding 24 could result from a short circuit in the primary winding 24 or a failure in the charge control unit 40. The primary overcurrent detector POD generates PRIM—OC, which is equal to −12 v when the current in the primary winding 24 is below the predetermined limit, and is pulled down to −12 v if the current exceeds the predetermined limit.

An imbalance detector IMBD detects a fault condition of either battery 36 or 38. There are two battery failure conditions that are detected by the imbalance detector IMBD. The first arises when the impedance of a battery or that of a cell increases significantly. Increased cell impedance can cause the battery to be incapable of providing current during the next discharge and can cause the cell to be reversed in voltage, subsequently overheating the cell and battery beyond a safe operating temperature. During recharge, if one of the batteries has a high impedance cell, it will accept less charging current than the other normally operating battery at the same charging voltage. This condition persists until the battery voltages exceed the float voltage level. If the current imbalance is such that the normally operating battery draws two thirds of the total charging current when the battery voltages exceed the float voltage level, then an imbalance condition is detected by the imbalance detector IMBD.

The second fault condition arises when one or more battery cells become short circuited. A short circuited cell can result in an increase in the cell's temperature beyond a safe operating temperature during a high current discharge and it can impair the overall discharge capacity of the battery. During recharge, if one of the batteries has a short circuited cell, then it will accept more current than the normally operating battery. An imbalance condition is detected if the short circuited battery draws more than two-thirds of the total charging current when the battery voltages reach the float voltage level.

The imbalance condition is detected by the imbalance detection circuit IMBD as follows. The current delivered to each of the batteries 36 and 38 is determined by the voltages IB1 and IB2 generated across each of the current measuring resistors 21 and 22 as shown in FIG. 2. The voltages IB1 and IB2 generate 0.1 v per amp of battery current. IB1 represents the current in battery 36 and is negative in polarity, while IB2 represents the current in battery 38 and is positive in polarity. Two amplifiers 71 and 73 multiply and filter IB1 and IB2. Each amplifier 71 and 73 produces an output voltage, IBAT1 on line 171 and IBAT2 on line 173. The voltage IBAT1, which is positive in polarity, is directly proportional to the current of battery 36; IBAT1 increases by 1.36 volts for each amp of current in battery 36. Likewise, the voltage IBAT2, which is negative in polarity, is directly proportional to the current of battery 38; IBAT2 decreases by 1.36 volts for each amp of current in battery 38. IBAT1 and IBAT2 are compared with the correct polarity of the reference voltage VREF by comparators 76 and 77. If either IBAT1 exceeds 5.1 v or if IBAT2 exceeds −5.1 v, then either battery 36 or battery 38 is drawing 50% more current than expected (i.e. two thirds of the total current instead of one half) and the wire ORed output IRESULT floats to +12 v. For example, if the total delivered current is 5.0 amps, each battery is expected to draw half, or 2.5 amps. A battery drawing 50% greater current draws 3.75 amps. IBAT1 and IBAT2 increase by 1.36 volts for each amp of battery current, 1.36×3.75=5.1 volts.

If the charge control unit 40 is operating in current mode, and one battery is at a significantly lower discharge state than the second battery, it may feasibly accept 50% greater current than expected. This is allowable in current mode. However, neither battery 36 nor 38 should continue to draw 50% greater current when the voltages (VB1 and VB2) of both batteries 36 and 38 are above float voltage. BATUV is maintained at +12 volts when VB1 and VB2 are above float voltage, as described above with reference to the battery voltage detector circuit 62. BATUV in conjunction with diode 79 enables passage of the signal IRESULT when VB1 and VB2 are above float voltage.

If IRESULT is equal to +12 v and BATUV is equal to +12 v, then there is a fault condition in either battery 36 or 38. The signal IMBALANCE at the output of comparator 78 is wire ored with PRIM—OC (the fault condition indicating an overcurrent in the primary winding 24) and BATOV (the fault condition indicating an overvoltage condition of either battery 36 or 38), generating the signal INTERNAL SHUTDOWN. It should be noted that if both batteries 36 and 38 fail in the same manner, there may not be an imbalance between the currents drawn by each battery 36 and 38, and therefore neither the IMBALANCE signal or the INTERNAL SHUTDOWN signal will be asserted.

INTERNAL SHUTDOWN, and EXTERNAL—SHUTDOWN (a shutdown signal provided by an external operator) signal a shutdown control circuit 80 to shutdown the charger by shutting down the pulse width modulator 54 in charge control unit 40. The EXTERNAL—SHUTDOWN signal advantageously enables an external operator to stop the charger without any internal faults in the battery charger. If either INTERNAL SHUTDOWN or EXTERNAL—SHUTDOWN is asserted, a signal SHUTDOWN on line 108 is pulled up to +12 v. SHUTDOWN effectively precludes the pulse width modulator 54 from producing pulses, hence stopping the cycling of the switches 14 and 16 and subsequently stopping delivery of current to the batteries 36 and 38. The shutdown of the charger may cause the fault condition to be removed, for example, the voltage of a battery 36 or 38 which exceeded the overvoltage limit will fall below that limit and therefore the BATOV signal is latched so that the SHUTDOWN signal continues to be asserted until bias power to the circuit has been removed and reapplied. The SHUTDOWN signal also is applied to an input of the comparator 66 in the charge OK detector CHD causing the signal MDOK to be pulled down to −12 v. A timer 82 controls the deassertion of SHUTDOWN after the fault condition has been removed from the charger. The timer 82 ensures that the battery charging system will be shutdown for a minimum of two seconds before starting a restart sequence. A persistent fault condition will cause a continuous restart and shutdown sequence of the battery charger, which alerts the operator of a problem in the battery backup system.

In the above described embodiment, the amplifiers 43,45,47,49,53,66,71 and 73 suitably may be Type LM358 low power dual operational amplifiers manufactured by National Semiconductor Corporation, Santa Clara, Calif. The comparator 62A,62B,-63A,63B,64,68,70,76,77 and 78 may suitably be Type LM393 devices also manufactured by National Semiconductor Corporation.

Various modifications of the above described embodiment may be made. For example, although described in relation to a charging system for two batteries, embodiments employing three or more batteries could be constructed, using an additional secondary winding for each additional battery. The fault detection circuit could then be modified to provide for detection of imbalance conditions arising from one or more batteries drawing more than a normal range of charging current, and initiation of appropriate safeguard procedures as described herein. Also, the number of cells or batteries in each battery pack such as 36 and 38 is not fixed, subject to each secondary winding of the transformer 120 being connected to the same battery load. The float voltage, i.e. the voltage applied by the charging circuit to the batteries under voltage mode operation of the charge control unit, would require corresponding modification and the current level delivered by the charger in the current mode of the charge control unit might possibly also require modification. While the embodiment specifically described herein is intended for use in conjunction with sealed lead-acid batteries, with modifications dependent on battery characteristics, it could be used with other battery chemistry types.

Thus, an apparatus for detecting faults within a battery backup charging system has been introduced. The present invention provides means for enabling early detection of battery failure before critical data and computing time is lost.

While there has been shown and described a preferred embodiment of this invention, it is to be understood that various adaptations and modifications may be made within the spirit and scope of the invention as defined by the claims.

What we claim is:

1. A battery charger for charging a plurality of batteries, comprising:
    a transformer, comprising a primary winding and a plurality of secondary windings;
    each of said secondary windings connected to a corresponding one of said plurality of batteries;
    a charge supply controller operable to repetitively switch a d.c. supply across said primary winding to cause a charging current to be supplied by each of said secondary windings to each corresponding battery of said plurality of batteries to charge each of said batteries to a voltage;
    said charge supply controller responsive to said charging current supplied to said plurality of batteries and responsive to said voltage of each battery of said plurality of batteries to control the rate of switching of said d.c. supply and said charging current supplied to said batteries; and
    supervisory means responsive to said voltage of each of said batteries and to said charging current of each of said secondary windings, for detecting when said voltage of any of said plurality of batteries rises above a predetermined voltage level or for detecting when said charging current to any of said batteries rises above a predetermined current level for discontinuing supply of charging current to said batteries.

2. A battery charger according to claim 1, wherein said supervisory means is separately responsive to the voltage of any battery of said plurality of batteries exceeding an overvoltage level greater than said predetermined voltage level for discontinuing supply of said charging current to said plurality of batteries.

3. A battery charger according to claim 1, wherein said supervisory means is further responsive to a current flow through said primary winding exceeding a predetermined level to discontinue supply of said charging current to said plurality of batteries.

4. A battery charger according to claim 1, wherein said primary winding is connected at each end to respective switches operable to connect and disconnect said primary winding to and from said d.c. supply, said battery charger including a pulse width modulator connected to operate said switches according to an adjustable duty cycle, and wherein said charge controller is connected to said pulse width modulator to adjust said duty cycle.

5. A battery charger for charging a plurality of batteries, comprising:
    a transformer, comprising a primary winding and a plurality of secondary windings, wherein each battery of said plurality of batteries is coupled to a corresponding one of said plurality of secondary windings;
    a plurality of switches for coupling a charging voltage supply to said transformer, said switches to allow delivery of a voltage to said primary winding of said transformer when in a closed position, and to allow each of said batteries to receive a current from said corresponding secondary winding of said transformer when said switches are in an open position;
    voltage measurement means for monitoring a voltage of each battery of said plurality of batteries, including means for determining a voltage offset between said voltage of each battery and a predetermined voltage;
    current measurement means for measuring said current from said secondary windings of said transformer;
    limiting means responsive to said voltage offset and said current measurement means for limiting said current from said secondary windings of said transformer to predetermined current;
    charge control logic responsive to said limiting means, for controlling said plurality of switches, said charge control logic to operate in a current mode and in a voltage mode; and supervisory means for detecting a plurality of fault conditions responsive to said current measurement means and said voltage measurement means, said supervisory means including shutdown means for disabling said charge control logic in the event one of said plurality of fault conditions is detected.

6. A battery charger comprising:

a transformer coupled to a DC charging voltage supply source, said transformer having a primary winding, and a plurality of secondary windings each having an equal number of turns;

a plurality of switches having an open position and a closed position coupled to said transformer and to said voltage source to control the application of voltage across said primary winding to create a primary winding current;

a plurality of capacitor and battery parallel pairs, each pair coupled to a corresponding one of said plurality of secondary windings to receive a charging current from said corresponding secondary winding when said switches are in said open position;

voltage measurement means for generating a first control voltage representing the sum of voltages of each battery of said plurality of batteries;

first current measurement means for providing a second control voltage representing a total charging current supplied by said plurality of secondary windings to said plurality of batteries;

second current measurement means for providing a plurality of individual voltages corresponding to said plurality of secondary windings representing the corresponding charging current supplied to said corresponding battery and capacitor pair by said corresponding secondary winding;

control means responsive to said first and second control voltages for controlling the operation of said switches between said open and closed positions;

overvoltage detection means responsive to said voltage measurement means for providing a first shutdown signal when the voltage of any battery of said plurality of batteries exceeds a first voltage limit;

overcurrent detection means responsive to said primary winding current to provide a second shutdown signal when said primary winding current exceeds a predetermined value;

imbalance detection means responsive to said voltage measurement means and said second current measurement means to provide a third shutdown signal when said first control voltage exceeds a first threshold voltage and any one of said plurality of individual voltages exceeds a second threshold voltage; and supervisory means separately responsive to each of said first, second and third shutdown signals for allowing said control means to disable operation of said switches.

7. The apparatus of claim 6, wherein said control means includes a pulse width modulator responsive to said first and second control voltages to adjust a duty cycle of said switches.

* * * * *